(12) United States Patent
Sakurai

(10) Patent No.: US 10,673,034 B2
(45) Date of Patent: Jun. 2, 2020

(54) BATTERY MODULE

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/017,271

(22) Filed: Jun. 25, 2018

(65) Prior Publication Data

US 2019/0006640 A1 Jan. 3, 2019

(30) Foreign Application Priority Data

Jun. 28, 2017 (JP) .................................. 2017-126433

(51) Int. Cl.
*H01M 2/10* (2006.01)
*H01M 2/26* (2006.01)

(52) U.S. Cl.
CPC ........... *H01M 2/10* (2013.01); *H01M 2/1077* (2013.01); *H01M 2/26* (2013.01)

(58) Field of Classification Search
None
See application file for complete search history.

(56) References Cited

U.S. PATENT DOCUMENTS

2010/0167115 A1* 7/2010 Okada ................. H01M 2/1077
429/99
2016/0013467 A1 1/2016 Kawata et al.

FOREIGN PATENT DOCUMENTS

| JP | 5405102 B2 | 2/2014 |
| JP | 2015-185413 A | 10/2015 |
| JP | 2015-225700 A | 12/2015 |
| JP | 2016-018766 A | 2/2016 |
| JP | 6310989 B1 | 4/2018 |

OTHER PUBLICATIONS

Feb. 5, 2019, Japanese Office Action issued for related JP Application No. 2017-126433.

* cited by examiner

*Primary Examiner* — Wyatt P McConnell
(74) *Attorney, Agent, or Firm* — Paratus Law Group, PLLC

(57) ABSTRACT

A battery module includes: a cell stack body; a pair of end plates disposed on a front surface and a rear surface of the cell stack body; and a fastening frame connecting the pair of end plates. The fastening frame includes: a pair of side frames disposed on the right surface and the left surface of the cell stack body. The pair of side frames each includes: a side frame body; a front turn-around portion that turn around the front surface of the cell stack body; and a rear turn-around portion that turn around the rear surface of the side frame body. The front turn-around portion and the rear turn-around portion each has a width in a front-rear direction larger than a width in a left-right direction of the side frame body.

10 Claims, 6 Drawing Sheets

BATTERY MODULE

CROSS-REFERENCE TO RELATED APPLICATION (S)

This application claims priority from Japanese Patent Application No. 2017-126433 filed on Jun. 28, 2017, the entire contents of which are incorporated herein by reference.

FIELD

The present invention relates to a battery module mounted on an electric vehicle.

BACKGROUND

A battery module has been mounted on an electric vehicle or the like. For example, a battery module is disclosed in Japanese Patent No. 5405102 which is formed by a plurality of cells stacked in a front-rear direction and includes a cell stack body having a front surface, a rear surface, a left surface, a right surface, an upper surface, and a lower surface, a pair of end plates disposed on the front surface and the rear surface of the cell stack body, and a fastening frame for connecting the pair of end plates.

In this type of battery module, a load in a cell stacking direction of the battery module (hereinafter, appropriately referred to as a cell thickness constraint reaction force) occurs due to expansion of the cell caused by temperature change and aging deterioration. In recent years, since more active material is packed in the cell in accordance with the high capacity and the high energy density of the cell, the cell thickness constraint reaction force tends to increase.

As disclosed in Japanese Patent No. 5405102, however, when the battery module includes side frames (metal bands) disposed on the right surface and the left surface of the cell stack body and the side frames respectively include side frame bodies and a front turn-around portion and a rear turn-around portion that turn around the front surface and the rear surface of the cell stack body (end plate) from the side frame body, since a load in a cell stacking direction due to expansion of the cell intensively acts on the front turn-around portion and the rear turn-around portion of the side frame, the front turn-around portion and the rear turn-around portion may be deformed in an opening direction, and movement of the end plates or dimensional variation of the battery module may occur.

SUMMARY

The present invention is to provide a battery module capable of preventing movement of end plates due to expansion of cells.

The invention provides following aspects (1) to (10).

(1) A battery module (e.g., a battery module 1 in an embodiment) including:

a cell stack body (e.g., a cell stack body 2 in an embodiment) that is constituted by a plurality of cells (e.g., cells 21 in an embodiment) stacked in a front-rear direction and includes a front surface, a rear surface, a left surface, a right surface, an upper surface, and a lower surface;

a pair of end plates (e.g., end plates 3 in an embodiment) that are disposed on the front surface and the rear surface of the cell stack body; and a fastening frame (e.g., a fastening frame 4 in an embodiment) that connects the pair of end plates, wherein the fastening frame includes a pair of side frames (e.g., side frames 5 in an embodiment) disposed on the right surface and the left surface of the cell stack body, the pair of side frames each includes;

a side frame body (e.g., a side frame body 51 in an embodiment);

a front turn-around portion (e.g., a front turn-around portion 52F in an embodiment) that turns around the front surface of the cell stack body from the side frame body; and a rear turn-around portion (e.g., a rear turn-around portion 52R in an embodiment) that turns around the rear surface of the cell stack body from the side frame body, and the front turn-around portion and the rear turn-around portion each has a width (e.g., widths W3 and W4 in an embodiment) in a front-rear direction larger than a width (e.g., a width W5 in an embodiment) in a left-right direction of the side frame body.

(2) The battery module according to (1), wherein the front turn-around portion includes:

a front fixing portion (e.g., a front fixing portion 53F in an embodiment) fixed to a front end plate of the pair of end plates; and a front connection portion (e.g., a front connection portion 54F in an embodiment) connecting between the side frame body and the front fixing portion, the rear turn-around portion includes:

a rear fixing portion (e.g., a rear fixing portion 53R in an embodiment) fixed to a rear end plate of the pair of end plates; and a rear connection portion (e.g., a rear connection portion 54R in an embodiment) connecting between the side frame body and the rear fixing portion, the front connection portion has a width (e.g., a width W3 in an embodiment) in the front-rear direction larger than a width (e.g., a width W4 in an embodiment) in the front-rear direction of the front fixing portion, and the rear connection portion has a width (e.g., a width W3 in an embodiment) in the front-rear direction larger than a width (e.g., a width W4 in an embodiment) in the front-rear direction of the rear fixing portion.

(3) The battery module according to (1) or (2), wherein the pair of side frames is configured such that the side frame bodies are connected to each other by a bridging portion (e.g., bridging portions 55 in an embodiment) extending in the left-right direction and an up-down direction.

(4) The battery module according to (3), wherein the pair of side frames are connected to each other by a plurality of the bridging portions, and a distance (e.g., a distance W6 in an embodiment) between the bridging portions adjacent to each other is larger than a width (e.g., a width W7 in an embodiment) in the front-rear direction of the cell.

(5) The battery module according to (3) or (4), wherein the bridging portion has a width (e.g., a width W8 in an embodiment) in the front-rear direction smaller than the width (e.g., widths W3 and W4 in an embodiment) in the front-rear direction of the front turn-around portion and the rear turn-around portion.

(6) The battery module according to any one of (3) to (5), wherein the bridging portion is formed integrally with the side frame bodies.

(7) The battery module according to any one of (1) to (6), wherein the cell stack body includes an external connection terminal (e.g., a an external connection terminal 23 in an embodiment), and the external connection terminal is fixed to one of the pair of end plates.

(8) The battery module according to any one of (1) to (7), wherein the pair of side frames each includes a projection (e.g., projection 51a in an embodiment) extending in the up-down direction between the cells adjacent to each other.

(9) The battery module according to (2), wherein an end face of a fastening member (e.g., a bolt B1 in an embodiment) fastening the front end plate to the front fixing portion is located closer to the cell stack body in the front-rear direction than an outermost surface of the front connection portion, and an end face of a fastening member (e.g., a bolt B1 in an embodiment) fastening the rear end plate to the rear fixing portion is located closer to the cell stack body in the front-rear direction than an outermost surface of the rear connection portion.

(10) The battery module according to (9), wherein the pair of end plates each includes:

a left end plate portion (e.g., a left end plate portion 32L in an embodiment);

a right end plate portion (e.g., a right end plate portion 32R in an embodiment); and a central end plate portion (e.g., a central end plate portion 31 in an embodiment) interposed between the left end plate portion and the right end plate portion in the left-right direction, the central end plate portion has a width (e.g., a width W1 in an embodiment) in the front-rear direction larger than a width (e.g., a width W2 in an embodiment) in the front-rear direction of the left end plate portion and the right end plate portion, the front turn-around portion has an outermost surface located closer to the cell stack body in the front-rear direction than an outermost surface of the central end plate portion, and the rear turn-around portion has an outermost surface located closer to the cell stack body in the front-rear direction than an outermost surface of the central end plate portion.

According to (1), since the width in the front-rear direction of the front turn-around portion and the rear turn-around portion turning around the front surface and the rear surface of the cell stack body from the side frame bodies, that is, the thicknesses of the front turn-around portion and the rear turn-around portion is larger than the width in the left-right direction of the side frame body, that is, the thickness of the side frame body, it is possible to increase a pressing force against the cell stack body. Therefore, the movement of the end plates can be prevented even when the load applied in the cell stacking direction of the battery module increases due to the expansion of the cell caused by temperature change and aging deterioration.

Since the thickness of the side frame body is thinner than the thicknesses of the front turn-around portion and the rear turn-around portion, the size and weight of the battery module can be reduced.

According to (2), since the width in the front-rear direction of the front connection portion for connecting the side frame body and the front fixing portion is larger than the width in the front-rear direction of the front fixing portion and the width of the rear connection portion for connecting the side frame body and the rear fixing portion is larger than the width in the front-rear direction of the rear fixing portion, it is possible to increase the rigidity of the portion where most of stress concentration easily occurs.

According to (3), since the pair of side frames is configured such that the side frame bodies are connected to each other by the bridging portion extending in the left-right direction and the up-down direction, the rigidity of the side frames is enhanced.

According to (4), since the pair of side frames are connected to each other by a plurality of the bridging portions and the distance between the bridging portions adjacent to each other is larger than a width in the front-rear direction of the cell, the separator function between the cells is imparted to the side frames, and the number of parts can be reduced.

According to (5), since the width in the front-rear direction of the bridging portion is smaller than the width in the front-rear direction of the front turn-around portion and the rear turn-around portion, it is possible to optimize the thickness of the portion where stress concentration easily occurs and the thickness of the other portions, thereby achieving reduction in size, reduction in weight, and cost reduction.

According to (6), since the bridging portion is formed integrally with the side frame body, the number of joining processes can be reduced.

According to (7), since the external connection terminal of the cell stack body is fixed to the end plate whose movement is regulated, the movement of the external connection terminal can also be regulated.

According to (8), since the pair of side frames each includes a projection extending in the up-down direction between the cells adjacent to each other, vibration in the front-rear direction of the cell can be prevented.

According to (9), since the end face of the fastening member for fastening the end plate to the front fixing portion of the side frame and the end face of the fastening member for fastening the end plate to the rear fixing portion of the side frame are located closer to the cell stack body in the front-rear direction than the outermost surface of the front connection portion and the rear connection portion, the overhanging of the fastening member can be prevented, and the fastening members can be protected by the front connection portion and the rear connection portion of the side frame.

According to (10), the pair of end plates each includes the left end plate portion and the right end plate portion formed in the left-right direction with the central end plate portion interposed therebetween, and the width in the front-rear direction of the central end plate portion is larger than the width in the front-rear direction of the left end plate portion and the right end plate portion, whereby it is possible to absorb the external impact at the central end plate portion.

In addition, since the outermost surfaces of the front turn-around portion and the rear turn-around portion are located closer to the cell stack body in the front-rear direction than the outermost surface of the central end plate portion, the overhanging of the front turn-around portion and the rear turn-around portion can be prevented, and the front turn-around portion and the rear turn-around portion can be protected by the central end plate portion of the end plate.

DETAILED DESCRIPTION

Figure 1:
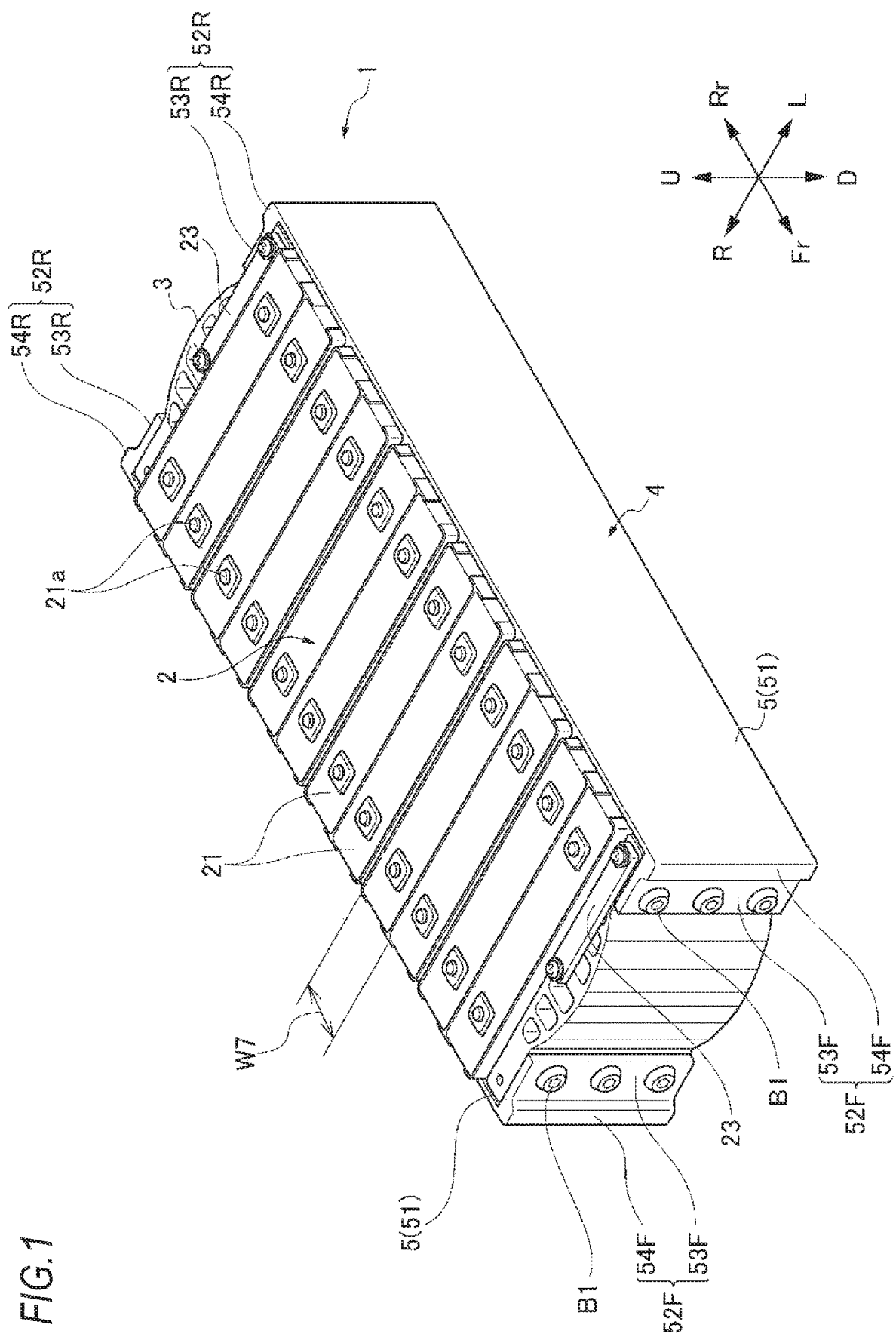
FIG. 1 is a perspective view of a battery module according to a first embodiment of the present invention as viewed obliquely from above.
Figure 2:
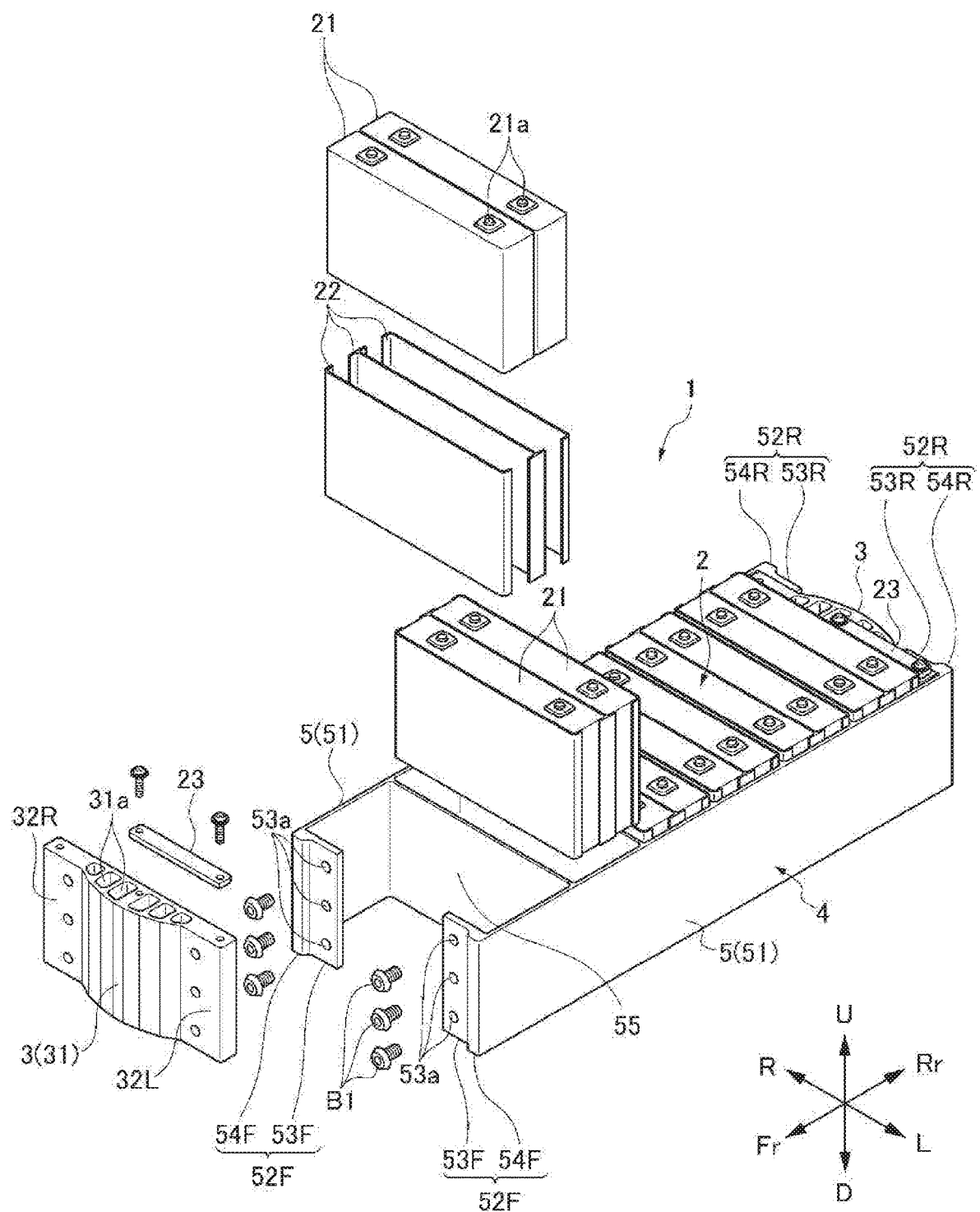
FIG. 2 is an exploded perspective view of the battery module according to the first embodiment of the present invention as viewed obliquely from above.
Figure 3:
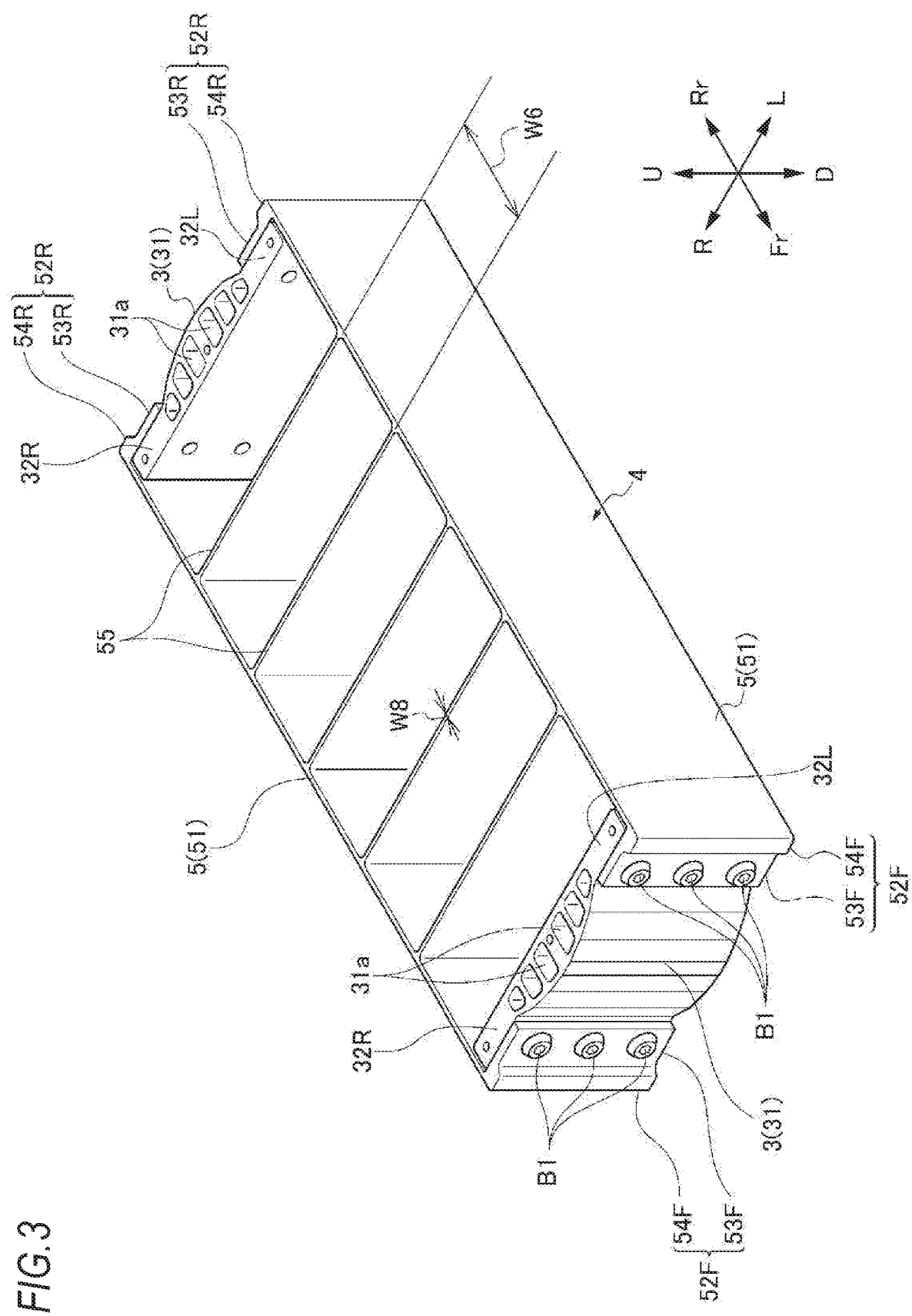
FIG. 3 is a perspective view illustrating an end plate and a fastening frame of the battery module according to the first embodiment of the present invention.

Battery modules according to embodiments of the present invention will be described with reference to the accompanying drawings. It is noted that the drawings are to be viewed in directions of reference numerals.

First Embodiment

As illustrated in FIGS. 1 to 4, a battery module 1 according to a first embodiment of the present invention is constituted by a cell stack body 2 in which a plurality of cells 21 are stacked in a front-rear direction, and which includes a front surface, a rear surface, a left surface, a right surface, an upper surface, and a lower surface, a pair of end plates 3 disposed on the front and rear surfaces of the cell stack body 2, and a fastening frame 4 for connecting the pair of end plates 3. The fastening frame 4 includes a pair of side frames disposed on the left and right surfaces of the cell stack body 2.

For the simple and clear description in this specification, a stacking direction of the cells 21 is defined as a front-rear direction, a direction orthogonal to the stacking direction of the cells 21 is defined as a left-right direction and an up-down direction. The stacking direction is irrelevant to a front-rear direction or the like of products on which a battery module 1 is mounted. That is, when the battery module 1 is mounted on a vehicle, the stacking direction of the cells 21 may be aligned with a front-rear direction of the vehicle, may be an up-down direction and a left-right direction of the vehicle, or may be inclined with respect to these directions. In the drawings, a front side, a rear side, a left side, a right side, an upper side, and a lower side of the battery module 1 are indicated by Fr, Rr, L, R, U, and D, respectively.

(Cell Stack Body)

The cell stack body 2 is formed by a plurality of cells 21 and a plurality of insulation member 22 which are alternately stacked in the front-rear direction. The pair of end plates 3 are disposed on the front and rear surfaces of the cell stack body 2 in an insulation state via the insulation members 22, and the pair of side frames 5 are disposed on the left and right surfaces of the cell stack body 2 in an insulation state via a slight gap therebetween.

It is known that the cell 21 expands due to temperature change or aging deterioration. The cell 21 has a rectangular parallelepiped shape in which a length in the up-down direction is longer than a length in the front-rear direction and a length in the left-right direction is longer than a length in the up-down direction. Therefore, the front surface and the rear surface of the cell 21 have a much larger area than the left surface, the right surface, the upper surface, and the lower surface, and the front surface and the rear surface of the cell 21 easily expand at a central part in the left-right direction and a central part in the up-down direction thereof.

A plurality of busbars (not illustrated) are disposed on the upper surface of the cell stack body 2 to be electrically connected to terminals 21a of the cells 2. As the busbars, there are busbars for connecting the terminals 21a of the cells 21 with each other or busbars for connecting the terminals 21a of the cells 21 with external connection terminals (not illustrated). When the position of the terminal 21a of the cell 21 and the external connection terminal 23 are relatively changed, connection failure may occur. Therefore, it is necessary to fix the external connection terminal 23 at a position where the position of the external connection terminal relative to the terminal 21a of the cell 21 does not change. In the present embodiment, the external connection terminal 23 is fixed to the end plate 3, and movement of the end plate 3 is prevented based on a structure of the side frame to be described below.

(End Plate)

The pair of end plates 3 respectively contact with the front surface and the rear surface of the cell stack body 2 through the insulation member 22, and receive a load in the cell stacking direction of the cell stack body 2 (hereinafter, also referred to as a cell thickness constraint reaction force as appropriate). The load in the cell stacking direction of the cell stack body 2 is mainly caused by expansion of the cells 21 due to temperature change or aging deterioration, and since the front surface and the rear surface of the cell 21 easily expand at the central part in the left-right direction and the central part in the up-down direction thereof as described above, a large load is applied to a central part in the left-right direction and a central part in the up-down direction of the end plate 3.

The end plate 3 is formed using an aluminum extrusion member and includes a central end plate portion 31 formed in a central region in the left-right direction and provided with a hollow portion 31a extending in the up-down direction and a left end plate portion 32L and a right end plate portion 32R formed in the left-right direction with the central end plate portion 31 interposed therebetween. As described above, the central end plate portion 31, to which the large load is applied in the cell stacking direction from the cell stack body 2, has a larger width W1 in the front-rear direction than a width W2 in the front-rear direction of the left end plate portion 32L and the right end plate portion 32R. Therefore, an inner surface of the end plate 3 in contact with the cell stack body 2 is flat, whereas an outer surface not in contact with the cell stack body 2 has a shape in which the central end plate portion 31 bulges outwards. This makes it possible to absorb the external impact in the cell stacking direction at the central end plate portion 31 including the hollow portion 31a.

(Side Frame)

The pair of side frames 5 are formed using an aluminum extrusion member. The side frame 5 includes a side frame body 51 extending along the left surface or the right surface of the cell stack body 2, and a front turn-around portion 52F and a rear turn-around portion 52R that turn around the front surface of the front-side end plate 3 and the rear surface of the rear-side end plate 3 from front and rear ends of the side frame body 51. In addition, the front turn-around portion 52F and the rear turn-around portion 52R each includes a front fixing portion 53F and a rear fixing portion 53R fixed to the end plate 3, and a front connection portion 54F and a rear connection portion 54R for connecting between the side frame body 51 and the front fixing portion 53F and between the side frame body 51 and the rear fixing portion 53R.

The front fixing portion 53F and the rear fixing portion 53R are provided with a plurality of fastening portions 53a that are fastened to the end plates 3 through bolts B1. The fastening portion 53a includes a round hole into which the bolt B1 is inserted, and the front turn-around portion 52F and the rear turn-around portion 52R are fastened to the end plates 3 when the bolts B1 inserted into the round hole are screwed to the end plates 3. Thus, the pair of end plates 3 are connected to each other through the pair of side frames 5.

Figure 4:
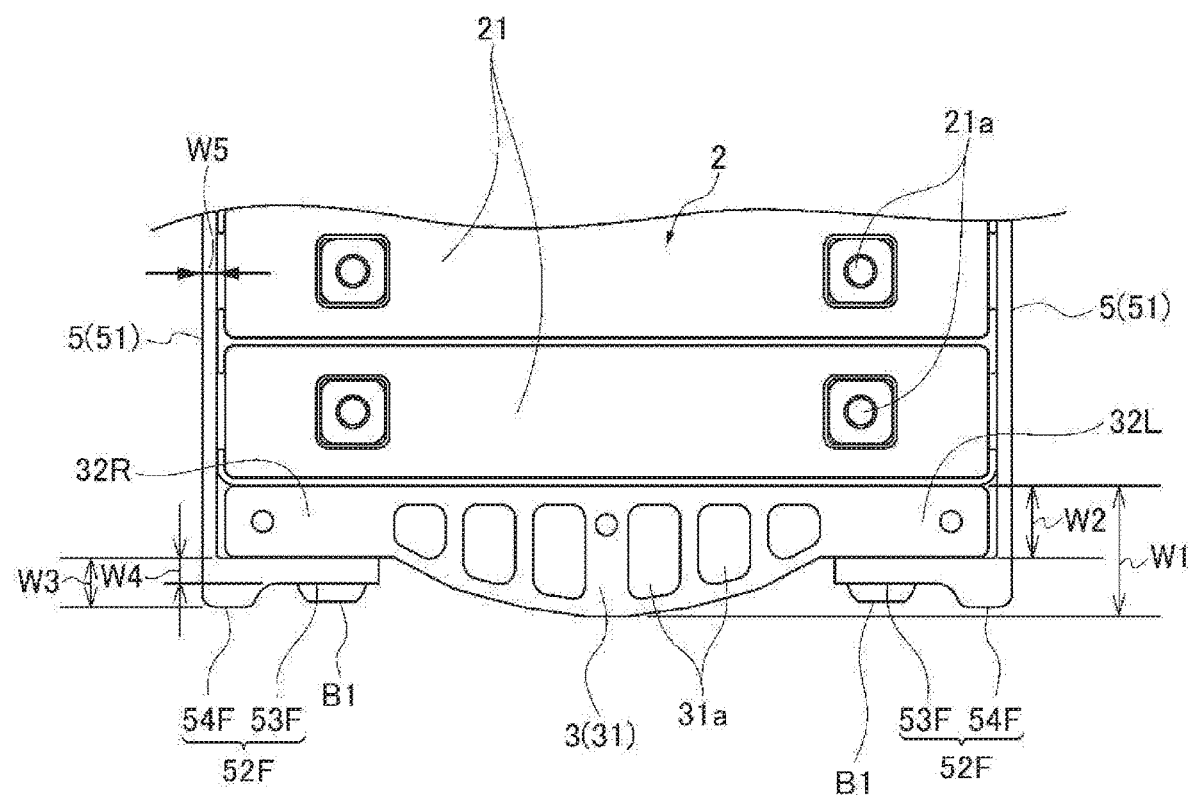
FIG. 4 is a plan view illustrating a main part of the battery module according to the first embodiment of the present invention.

As illustrated in FIG. 4, widths W3 and W4 in the front-rear direction of the front turn-around portion 52F and the rear turn-around portion 52R, that is, thicknesses of the front turn-around portion 52F and the rear turn-around portion 52R is larger than a width W5 in the left-right direction of the side frame body 51, that is, a thickness of the side frame body 51. This makes it possible to increase a pressing force of the front turn-around portion 52F and the rear turn-around portion 52R against the cell stack body 2 and to prevent movement of the end plate 3 (including an external connection terminal 23) even when a load applied in the cell stacking direction of the battery module 1 increases due to expansion of the cell 21 caused by temperature change and aging deterioration.

In the front turn-around portion 52F and the rear turn-around portion 52R, the width W3 in the front-rear direction of the front connection portion 54F for connecting the side frame body 51 and the front fixing portion 53F and the rear connection portion 54R for connecting the side frame body 51 and the rear fixing portion 53R is larger than the width W4 in the front-rear direction of the front fixing portion 53F and the rear fixing portion 53R. This makes it possible to increase rigidity of the front connection portion 54F and the rear connection portion 54R where most of stress concentration easily occurs in the front turn-around portion 52F and the rear turn-around portion 52R.

By the setting of the widths W3 and W4, an end face of the bolt B1 fastening the end plate 3 to the front fixing portion 53F and the rear fixing portion 53R of the side frame 5 is located closer to the cell stack body 2 in the front-rear direction than the outermost surface of the front connection portion 54F and the rear connection portion 54R. Thus, overhanging of the bolt B1 is prevented, and the front connection portion 54F and the rear connection portion 54R receive the external impact in the cell stacking direction earlier than the bolt B1, whereby the bolt B1 can be protected by the front connection portion 54F and the rear connection portion 54R.

In addition, the outermost surfaces of the front turn-around portion 52F and the rear turn-around portion 52R are located closer to the cell stack body 2 in the front-rear direction than the outermost surface of the central end plate portion 31 of the end plate 3. Thus, the central end plate portion 31 of the end plate 3 receives the external impact in the cell stacking direction earlier than the front turn-around portion 52F and the rear turn-around portion 52R, whereby the front turn-around portion 52F and the rear turn-around portion 52R can be protected by the central end plate portion 31 of the end plate 3.

In the pair of side frames 5, the side frame bodies 51 are connected to each other by bridging portions 55 extending in the left-right direction and the up-down direction. A plurality of bridging portions 55 (for example, five bridging portions) are provided with predetermined distances W6 in the front-rear direction. Thus, the rigidity of the side frame 5 is enhanced.

The distance W6 between the bridging portions 55 adjacent to each other is larger than a width W7 in the front-rear direction of the cell 21. In the present embodiment, for example, the distance W6 between the bridging portions 55 adjacent to each other is larger than twice the width W7, and two cells 21 are accommodated between the bridging portions 55 adjacent to each other. Thus, a separator function between the cells 21 is imparted to the side frame 5, and the number of parts can be reduced.

A width W8 in the front-rear direction of the bridging portion 55 is smaller than the widths W3 and W4 in the front-rear direction of the front turn-around portion 52F and the rear turn-around portion 52R. Thus, it is possible to optimize the thickness of the portion where stress concentration easily occurs and the thickness of the other portions, thereby achieving reduction in size, reduction in weight, and cost reduction.

The bridging portions 55 are formed integrally with the side frame bodies 51 in aluminum extrusion molding. Thus, a process of joining the side frame bodies 51 to the bridging portions 55 is not necessary, and the number of joining processes can be reduced. However, the bridging portion 55 is not limited to being formed integrally with the side frame body 51, and may be formed separately from the side frame body 51 and then joined to the side frame body 51.

As described above, according to the battery module 1 of the present embodiment, since widths W3 and W4 in the front-rear direction of the front turn-around portion 52F and the rear turn-around portion 52R turning around the front surface and the rear surface of the cell stack body 2 from the side frame body 51, that is, the thicknesses of the front turn-around portion 52F and the rear turn-around portion 52R is larger than the width W5 in the left-right direction of the side frame body 51, that is, the thickness of the side frame body 51, it is possible to increase a pressing force against the cell stack body 2. Therefore, the movement of the end plate 3 can be prevented even when the load applied in the cell stacking direction of the battery module 1 increases due to the expansion of the cell 21 caused by temperature change and aging deterioration.

Further, since the thickness W5 of the side frame body 51 is thinner than the thicknesses W3 and W4 of the front turn-around portion 52F and the rear turn-around portion 52R, the size and weight of the battery module 1 can be reduced.

Since the width W3 in the front-rear direction of the front connection portion 54F for connecting the side frame body 51 and the front fixing portion 53F and the rear connection portion 54R for connecting the side frame body 51 and the rear fixing portion 53R is larger than the width W4 in the front-rear direction of the front fixing portion 53F and the rear fixing portion 53R it is possible to increase the rigidity of the portion where most of stress concentration easily occurs.

In the pair of side frames 5, since the side frame bodies 51 are connected to each other by the bridging portions 55 extending in the left-right direction and the up-down direction, the rigidity of the side frame 5 is enhanced.

Further, since the pair of side frames 5 are connected to each other the plurality of bridging portions 55 the distance W6 between the bridging portions 55 adjacent to each other is larger than a width W7 in the front-rear direction of the cell 21, the separator function between the cells 21 is imparted to the side frame 5, and the number of parts can be reduced.

In addition, since the width W8 in the front-rear direction of the bridging portion 55 is smaller than the widths W3 and W4 in the front-rear direction of the front turn-around portion 52F and the rear turn-around portion 52R, it is possible to optimize the thickness of the portion where stress concentration easily occurs and the thickness of the other portions, thereby achieving reduction in size, reduction in weight, and cost reduction.

In addition, since the bridging portion 55 is formed integrally with the side frame body 51, the number of joining processes can be reduced.

Further, since the external connection terminal 23 of the cell stack body 2 is fixed to the end plate 3 whose movement is regulated, the movement of the external connection terminal 23 can also be regulated.

In addition, since the end face of the bolt B1 fastening the end plate 3 to the front fixing portion 53F and the rear fixing portion 53R of the side frame 5 is located closer to the cell stack body 2 in the front-rear direction than the outermost surface of the front connection portion 54F and the rear connection portion 54R, the overhanging of the bolt B1 can be prevented, and the bolt B1 can be protected by the front connection portion 54F and the rear connection portion 54R of the side frame 5.

In addition, each of the pair of end plates 3 includes the left end plate portion 32L and the right end plate portion 32R formed in the left-right direction with the central end plate portion 31 interposed therebetween, the central end plate portion 31 is provided with the hollow portion 31a extending in the up-down direction, and the width W1 in the front-rear direction of the central end plate portion 31 is larger than the width W2 in the front-rear direction of the left end plate portion 32L and the right end plate portion 32R, whereby it is possible to absorb the external impact at the central end plate portion 31 including the hollow portion 31a.

Further, since the outermost surfaces of the front turn-around portion 52F and the rear turn-around portion 52R are located closer to the cell stack body 2 in the front-rear direction than the outermost surface of the central end plate portion 31, the overhanging of the front turn-around portion 52F and the rear turn-around portion 52R can be prevented, and the front turn-around portion 52F and the rear turn-around portion 52R can be protected by the central end plate portion 31 of the end plate 3.

Second Embodiment

A battery module according to a second embodiment of the present invention will be described below with reference to FIGS. 5 and 6. However, only the differences from the first embodiment will be described, and the configurations common to the first embodiment will be denoted by the same reference numerals as in the first embodiment, so that the description of the first embodiment will be cited.

Figure 5:
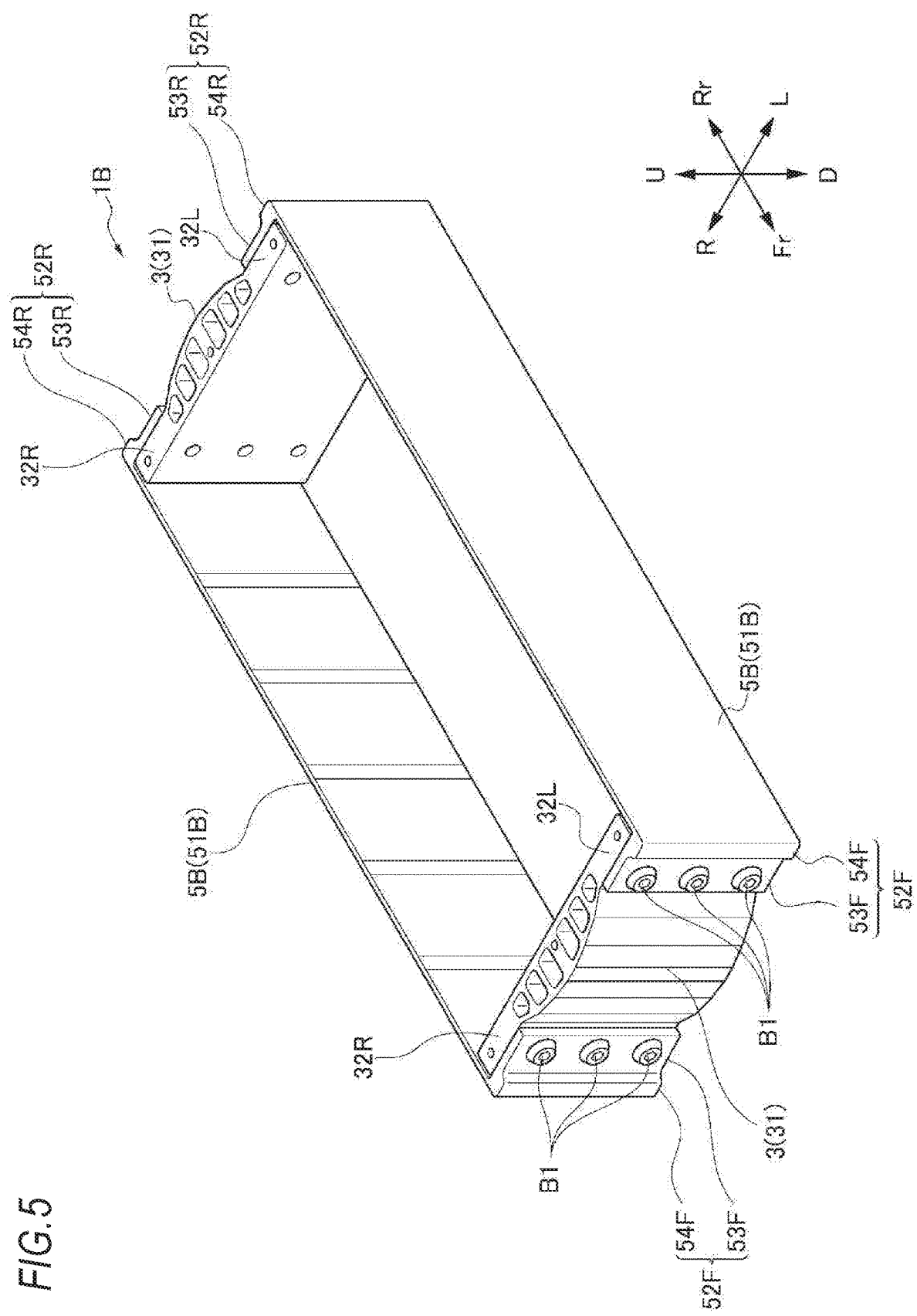
FIG. 5 is a perspective view illustrating an end plate and a fastening frame of a battery module according to a second embodiment of the present invention.

As illustrated in FIG. 5, a battery module 1B according to the second embodiment differs from that of the first embodiment in that bridging portions for connecting side frame bodies 51B of a pair of side frame 5B to each other is not provided and the pair of side frames 5B are formed as separate members separated from each other.

Third Embodiment

Figure 6:
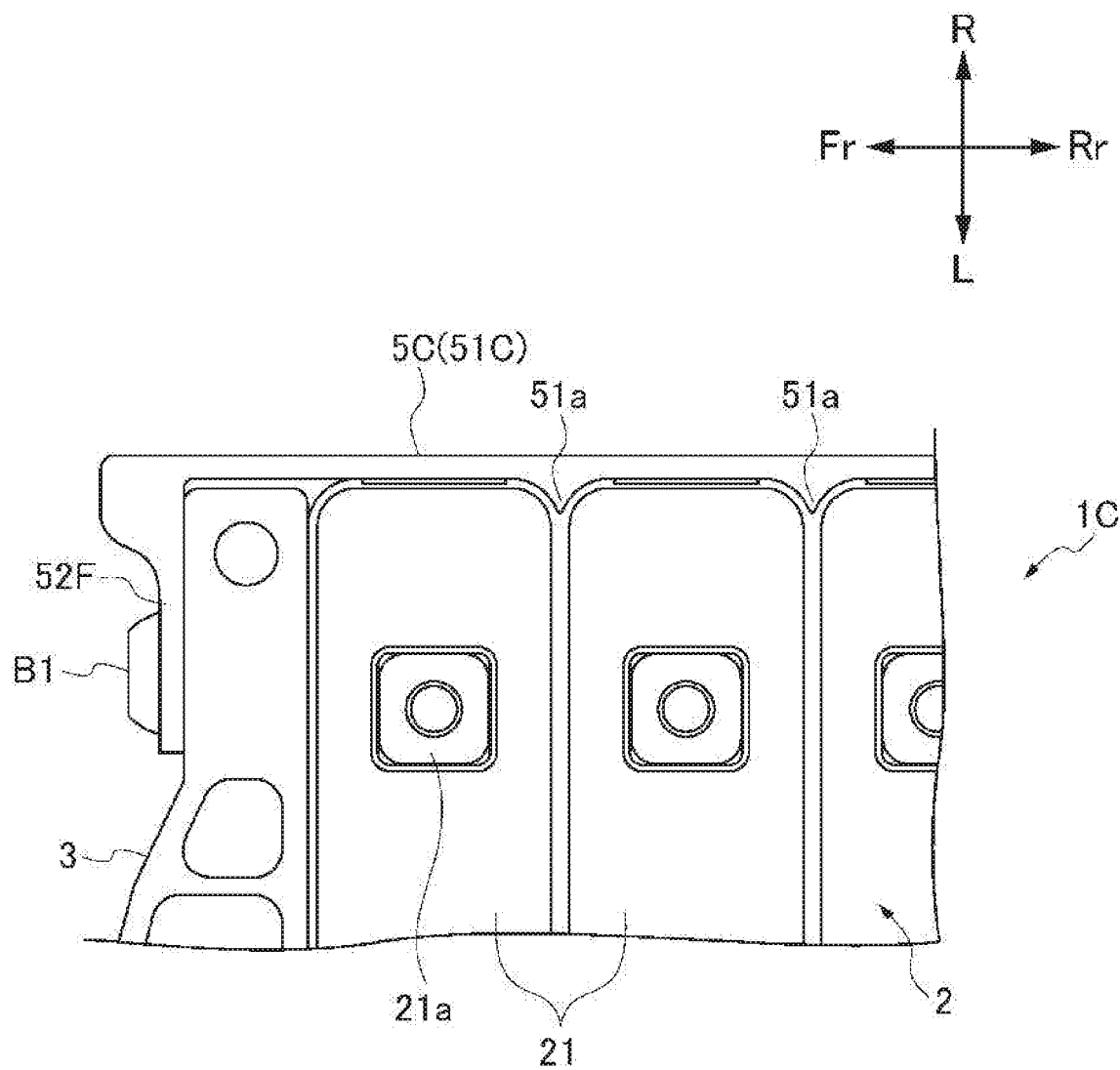
FIG. 6 is a plan view illustrating a main part of a battery module according to a third embodiment of the present invention.

As illustrated in FIG. 6, a battery module 1C according to a third embodiment differs from that of the first embodiment in that a side frame body 51C of a side frame 5C is provided with a plurality of projections 51a extending in an up-down direction between cells 21 adjacent to each other. For example, as illustrated in FIG. 6, the projection 51a has a shape conforming to a shape of a corner of the cells 21 adjacent to each other, and is engaged with the cell 21 in the front-rear direction. According to the battery module 1C of the third embodiment, vibration in the front-rear direction of the cell 21 can be prevented by the plurality of projections 51a provided in the side frame body 51C of the side frame 5C.

It is noted that the present invention is not limited to the above-described embodiments, but can be appropriately modified and improved.

The invention claimed is:

1. A battery module comprising:
a cell stack body that is constituted by a plurality of cells (e.g., cells 21 in an embodiment) stacked in a front-rear direction and comprises a front surface, a rear surface, a left surface, a right surface, an upper surface, and a lower surface;
a pair of end plates that are disposed on the front surface and the rear surface of the cell stack body; and
a fastening frame that connects the pair of end plates, wherein
the fastening frame comprises a pair of side frames disposed on the right surface and the left surface of the cell stack body,
the pair of side frames each comprises:
a side frame body,
a front turn-around portion that turns around the front surface of the cell stack body from the side frame body; and
a rear turn-around portion that turns around the rear surface of the cell stack body from the side frame body, and
the front turn-around portion and the rear turn-around portion each has a width in a front-rear direction larger than a width in a left-right direction of the side frame body.

2. The battery module according to claim 1, wherein
the front turn-around portion comprises:
a front fixing portion fixed to a front end plate of the pair of end plates; and
a front connection portion connecting between the side frame body and the front fixing portion,
the rear turn-around portion comprises:
a rear fixing portion fixed to a rear end plate of the pair of end plates; and
a rear connection portion connecting between the side frame body and the rear fixing portion,
the front connection portion has a width in the front-rear direction larger than a width in the front-rear direction of the front fixing portion, and
the rear connection portion has a width in the front-rear direction larger than a width in the front-rear direction of the rear fixing portion.

3. The battery module according to claim 1, wherein
the pair of side frames is configured such that the side frame bodies are connected to each other by a bridging portion extending in the left-right direction and an up-down direction.

4. The battery module according to claim 3, wherein
the pair of side frames are connected to each other by a plurality of the bridging portions, and
a distance between the bridging portions adjacent to each other is larger than a width in the front-rear direction of the cell.

5. The battery module according to claim 3, wherein
the bridging portion has a width in the front-rear direction smaller than the width in the front-rear direction of the front turn-around portion and the rear turn-around portion.

6. The battery module according to claim 3, wherein
the bridging portion is formed integrally with the side frame bodies.

7. The battery module according to claim 1, wherein
the cell stack body includes an external connection terminal, and
the external connection terminal is fixed to one of the pair of end plates.

8. The battery module according to claim 1, wherein
the pair of side frames each includes a projection extending in the up-down direction between the cells adjacent to each other.

9. The battery module according to claim 2, wherein
an end face of a fastening member fastening the front end plate to the front fixing portion is located closer to the cell stack body in the front-rear direction than an outermost surface of the front connection portion, and
an end face of a fastening member fastening the rear end plate to the rear fixing portion is located closer to the cell stack body in the front-rear direction than an outermost surface of the rear connection portion.

10. The battery module according to claim 9, wherein
the pair of end plates each includes:
a left end plate portion;
a right end plate portion; and
a central end plate portion interposed between the left end plate portion and the right end plate portion in the left-right direction,
the central end plate portion has a width in the front-rear direction larger than a width in the front-rear direction of the left end plate portion and the right end plate portion,
the front turn-around portion has an outermost surface located closer to the cell stack body in the front-rear direction than an outermost surface of the central end plate portion, and
the rear turn-around portion has an outermost surface located closer to the cell stack body in the front-rear direction than an outermost surface of the central end plate portion.

\* \* \* \* \*